US007567001B2

(12) United States Patent
Kasai et al.

(10) Patent No.: US 7,567,001 B2
(45) Date of Patent: Jul. 28, 2009

(54) COMPACT FAN MOTOR AND ELECTRIC DEVICE COMPRISING A COMPACT FAN MOTOR

(75) Inventors: Toshiaki Kasai, Itabashi-ku (JP); Tomoaki Hoshina, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 364 days.

(21) Appl. No.: 11/651,429

(22) Filed: Jan. 8, 2007

(65) Prior Publication Data

US 2007/0176502 A1 Aug. 2, 2007

(30) Foreign Application Priority Data

Jan. 13, 2006 (JP) .............................. P2006-005889

(51) Int. Cl.
*H02K 5/22* (2006.01)
*F04B 17/03* (2006.01)
*F04D 25/08* (2006.01)

(52) U.S. Cl. .............................. 310/71; 310/58; 310/91; 417/423.14; 417/424.1

(58) Field of Classification Search ............... 310/67 R, 310/58, 71, 60 R, 91; 417/423.14, 424.1, 417/424.2

See application file for complete search history.

(56) References Cited

U.S. PATENT DOCUMENTS

| 3,919,573 | A | * | 11/1975 | Schmuck ..................... 310/50 |
| 4,233,531 | A | * | 11/1980 | Nakano et al. ................ 310/42 |
| 4,636,669 | A | * | 1/1987 | Plunkett et al. ............... 310/51 |
| 4,686,400 | A | * | 8/1987 | Fujisaki et al. ............ 310/67 R |
| 5,119,466 | A | * | 6/1992 | Suzuki ....................... 388/831 |
| 5,696,416 | A | * | 12/1997 | Baker et al. .................... 310/91 |
| 5,716,200 | A | * | 2/1998 | Mirumachi et al. ......... 417/360 |
| 5,969,445 | A | * | 10/1999 | Horiuchi et al. ............... 310/64 |
| 6,037,688 | A | * | 3/2000 | Gilliland et al. ............... 310/89 |
| 6,171,079 | B1 | * | 1/2001 | Gross et al. ............. 417/423.12 |
| 7,390,172 | B2 | * | 6/2008 | Winkler ................. 417/423.15 |
| 2004/0095029 | A1 | * | 5/2004 | Ewert et al. ................... 310/89 |
| 2004/0234389 | A1 | * | 11/2004 | Hatano et al. ............... 417/370 |
| 2007/0001527 | A1 | * | 1/2007 | Takahashi et al. ............. 310/71 |
| 2008/0020698 | A1 | * | 1/2008 | Spaggiari .................... 454/139 |

FOREIGN PATENT DOCUMENTS

JP 8-223863 8/1996
JP 2005-245172 9/2005

* cited by examiner

*Primary Examiner*—Burton Mullins
(74) *Attorney, Agent, or Firm*—Beyer Law Group LLP

(57) ABSTRACT

A compact fan motor including a motor body having a tubular case accommodating a rotor, a permanent magnet, and brushes, and a pair of spring terminals that are connected to the brushes, sticks out from a peripheral wall of the tubular case, and has elasticity in a direction perpendicular to an axis of rotation of a shaft; an impeller fixed to the shaft sticking out from a front end of the tubular case; a holder having a case accommodating portion that is provided in a housing accommodating the motor body and impeller and has an inner wall surface extending in the direction of the axis of rotation of the shaft, and a motor body insertion opening provided at an edge of the case accommodating portion; and a pair of conductors provided on the inner wall surface of the holder while contacting with the spring terminals.

6 Claims, 6 Drawing Sheets

COMPACT FAN MOTOR AND ELECTRIC DEVICE COMPRISING A COMPACT FAN MOTOR

BACKGROUND OF THE INVENTION

1. Field of the Invention

The present invention relates to a compact fan motor incorporated in various electronic devices such as mobile phones, car navigation systems, camcorders, and personal computers, and to an electronic device comprising a compact fan motor.

2. Related Background of the Invention

A brushless fan motor is known as a conventional technology in this field. In this type of fan motor, a shaft is supported by a bearing provided in a housing and an impeller is fixed to a front end of the shaft. An annular magnet is fixed to a back side of the impeller. A circuit board is fixed to the housing, and a coil disposed opposite to the magnet and a Hall element for detecting magnetic poles of the magnet are mounted on the circuit board. The impeller rotates in one direction when power distribution to the coil is switched after magnetic pole detection by the Hall element (See Patent Document 1 and Patent Document 2).

[Patent Document 1] Japanese Patent Application Laid-Open No. Hei 8-223863

[Patent Document 2] Japanese Patent Application Laid-Open No. 2005-245172

With miniaturization of various electronic devices, miniaturization of fan motor incorporated in such an electronic device is also desired. In a conventional fan motor, a magnet is provided integrally in a boss portion of an impeller and an effective area in a diameter direction of a vane of the impeller is made smaller by an area occupied by the magnet. Particularly, if the impeller is made smaller with miniaturization of the fan motor, the boss portion is hard to miniaturize because of many constraints of the magnet fixed to the impeller in connection with the coil on the circuit board, resulting in the effective area in the diameter direction of the impeller likely to be made still smaller. Further, the circuit board fixed to the housing must also be made smaller with miniaturization of the fan motor, but miniaturization thereof is hard in consideration of arrangements of the Hall element and coil.

An object of the present invention is to provide a compact fan motor that facilitates further miniaturization while broadening an effective area of a vane of an impeller and electronic devices comprising a compact fan motor.

SUMMARY OF THE INVENTION

A compact fan motor according to the present invention includes a motor body having a rotor with a commutator fixed to a shaft, a stator surrounding the rotor, a pair of brushes slidingly contacts with the commutator, a tubular case for accommodating the rotor, stator, and brushes, and a pair of spring terminals connected to the brushes, sticks out from a peripheral wall of the tubular case, and has elasticity in a direction perpendicular to an axis of rotation of the shaft; an impeller fixed to the shaft that sticks out from a front end of the tubular case; a holder having a case accommodating portion that is provided in a housing accommodating the motor body and the impeller and has an inner wall surface extending in the direction of the axis of rotation of the shaft, and a motor body insertion opening provided at an edge of the case accommodating portion; and a pair of conductors provided on the inner wall surface of the holder and contacts with the spring terminals.

The compact fan motor has a rotor and a stator accommodated in the tubular case of the motor body and there is no need for providing a magnet on a back side of the impeller, and as a result, it is easier to broaden an effective area in the diameter direction of the vane of the impeller even if the impeller is made smaller. It is also easier to extend the effective area of the vane of the impeller in the direction along the axis of rotation of the shaft because less constraint is imposed on layout on the back side of the impeller. Further, when mounting the motor body to the holder, the motor body is inserted through the motor body insertion opening into the case accommodating portion while positioning the spring terminals so that the spring terminals maintain contact with the pair of conductors. Then, the tubular case is pressed in the direction perpendicular to the axis of rotation of the shaft by an elastic force of the spring terminals so that the tubular case is pushed against the inner wall surface of the case accommodating portion, temporarily holding the motor body to the holder. Since the motor body is temporarily held inside the holder while the spring terminals contacts with the conductors, as described above, assembly of the compact fan motor is made easier and also a stable energized state between the spring terminals and conductors can be maintained more easily. Further, use of known motor bodies makes reduction in the number of components and costs possible.

It is more suitable for the motor body if the motor body has a terminal block on which the spring terminals are attached, a pair of parallel sidewall surfaces extending in the direction of the axis of rotation of the shaft is provided on the terminal block, a terminal block accommodating portion extending in the direction of the axis of rotation of the shaft and communicating with the case accommodating portion is provided in the holder, and a pair of parallel guide surfaces extending in the direction of the axis of rotation of the shaft is formed in the terminal block accommodating portion so as to sandwich the pair of the sidewall surfaces.

It is more suitable for the compact fan motor according to the present invention if the conductors are provided on the inner wall surface of the terminal block accommodating portion.

With the above structure, the spring terminals and conductors can easily be brought into contact during assembly by inserting the pair of sidewall surfaces of the terminal block along the guide surfaces of the terminal block accommodating portion into the terminal block accommodating portion. Also, when mounting the motor body to the holder, the spring terminals and conductors are less likely to be dislocated and contact failure will not occur. Furthermore, since the terminal block is sandwiched by the pair of guide surfaces of the terminal block accommodating portion, the motor body can be prevented from swinging in the holder, making maintenance of a stable energized state between the spring terminals and conductors still easier.

It is more suitable if the motor body is fixed inside the holder by pressing the edge on a side of the motor body insertion opening of the holder. By pressing the holder in such a position, the motor body can easily and reliably be fixed to the housing after loading the motor body into the holder, preventing the motor body from falling through the motor body insertion opening. Also, if a metallic tubular case is fixed to a resin holder only by press fitting, for example, the fixed portion is likely to be affected by aging due to different coefficients of thermal expansion resulting from a difference in material. If, however, the motor body is fixed to the holder by pressing, as described above, the fixed portion is less likely to be affected by aging even if the holder and the motor body are made of different materials, contributing to longer life.

It is more suitable for the compact fan motor according to the present invention if the compact fan motor further comprising a tubular outer frame portion extending in the direction of the axis of rotation of the shaft; and a beam connecting the outer frame portion and the case accommodating portion, and the impeller sends out air in the direction along the axis of rotation of the shaft.

An electronic device according to the present invention includes the above-described compact fan motor.

According to the present invention, further miniaturization can be facilitated while extending an effective area of vanes of an impeller.

EXPLANATION OF NUMERALS

1. Compact fan motor, 2. Shaft, 3. Motor body, 4. Impeller, 6. Housing, 7. Rotor, 8. Stator, 9. Tubular case, 9b. Bottom bracket, 9e. Sidewall, 10. Commutator, 11. Brush, 12. Spring terminal, 13. Terminal block, 13a. Sidewall surface, 16. Holder, 17. Case accommodating portion, 17a. Internal wall surface, 17b. Motor body insertion opening, 17c. Bottom, 18. Terminal block accommodating portion, 18c, 18d. Guide surface, 18f. Internal wall surface, 21. Conductor, C1. Axis of rotation, P1 to P3. Pressing portion

DESCRIPTION OF THE PREFERRED EMBODIMENTS

A suitable embodiment of a compact fan motor 1 according to the present invention will be described below in detail with reference to drawings.

Figure 1:
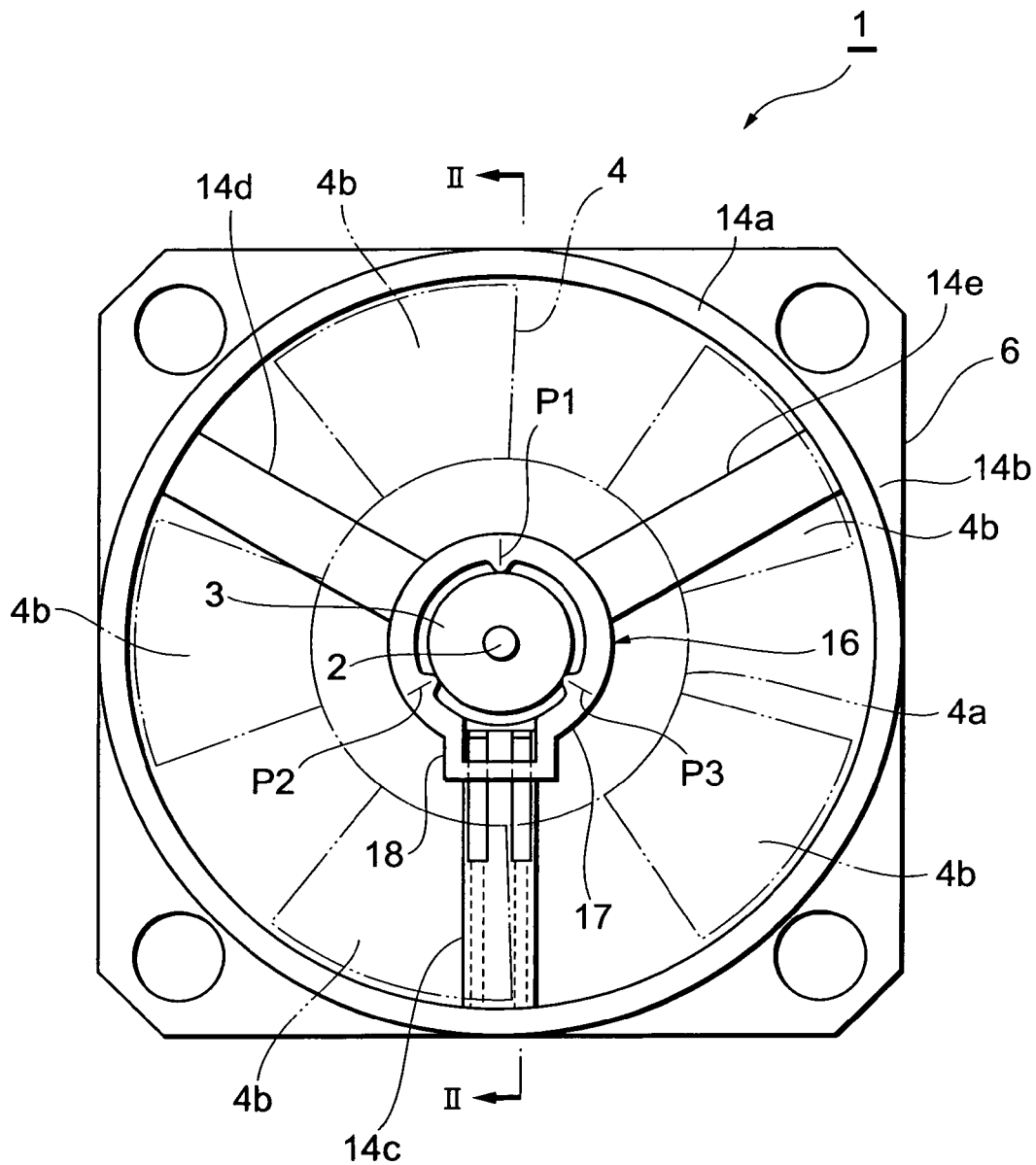
FIG. 1 is a front view showing an embodiment of a compact fan motor according to the present invention.
Figure 2:
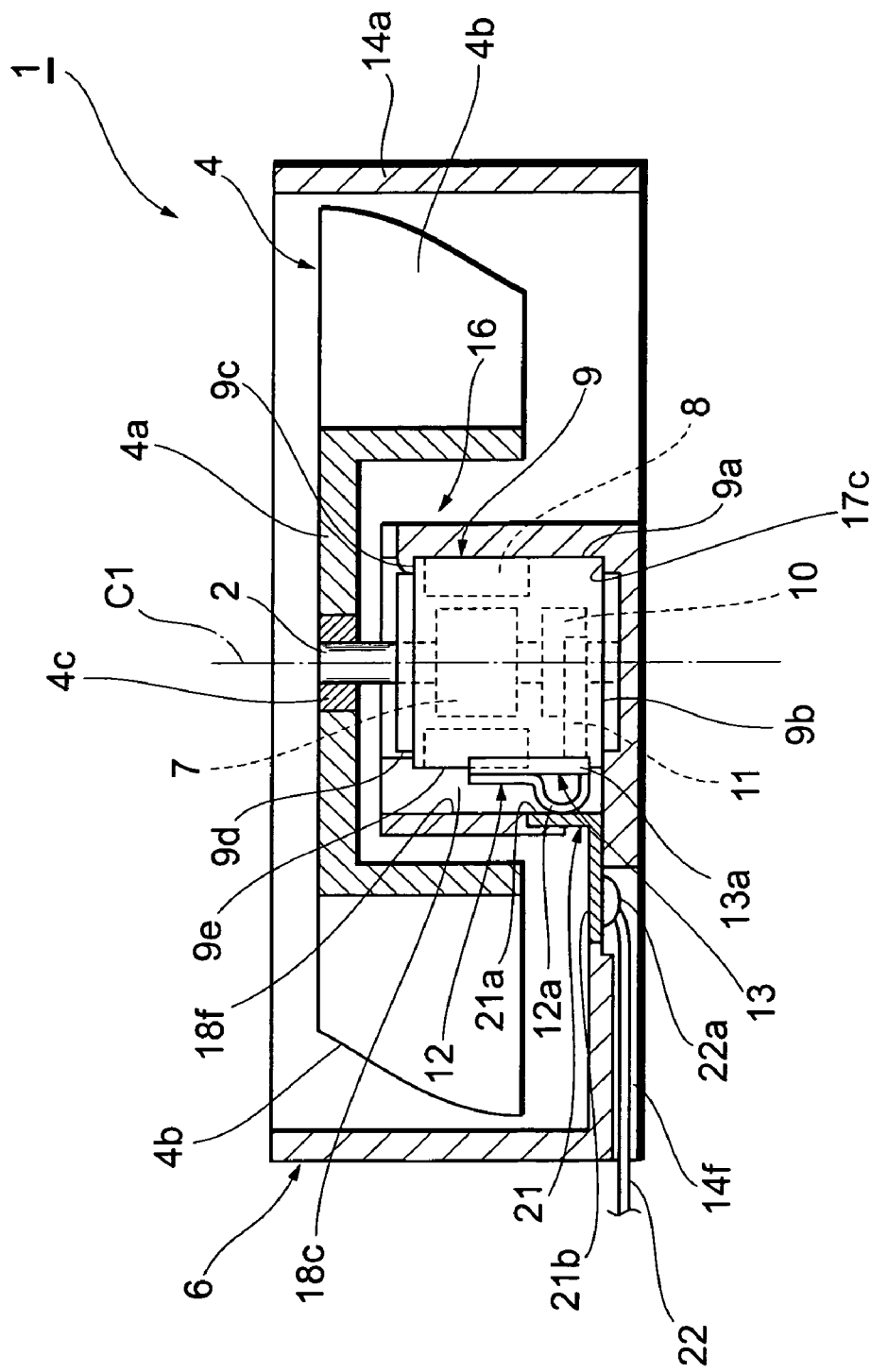
FIG. 2 is a sectional view along a II-II line in FIG. 1.
Figure 3:
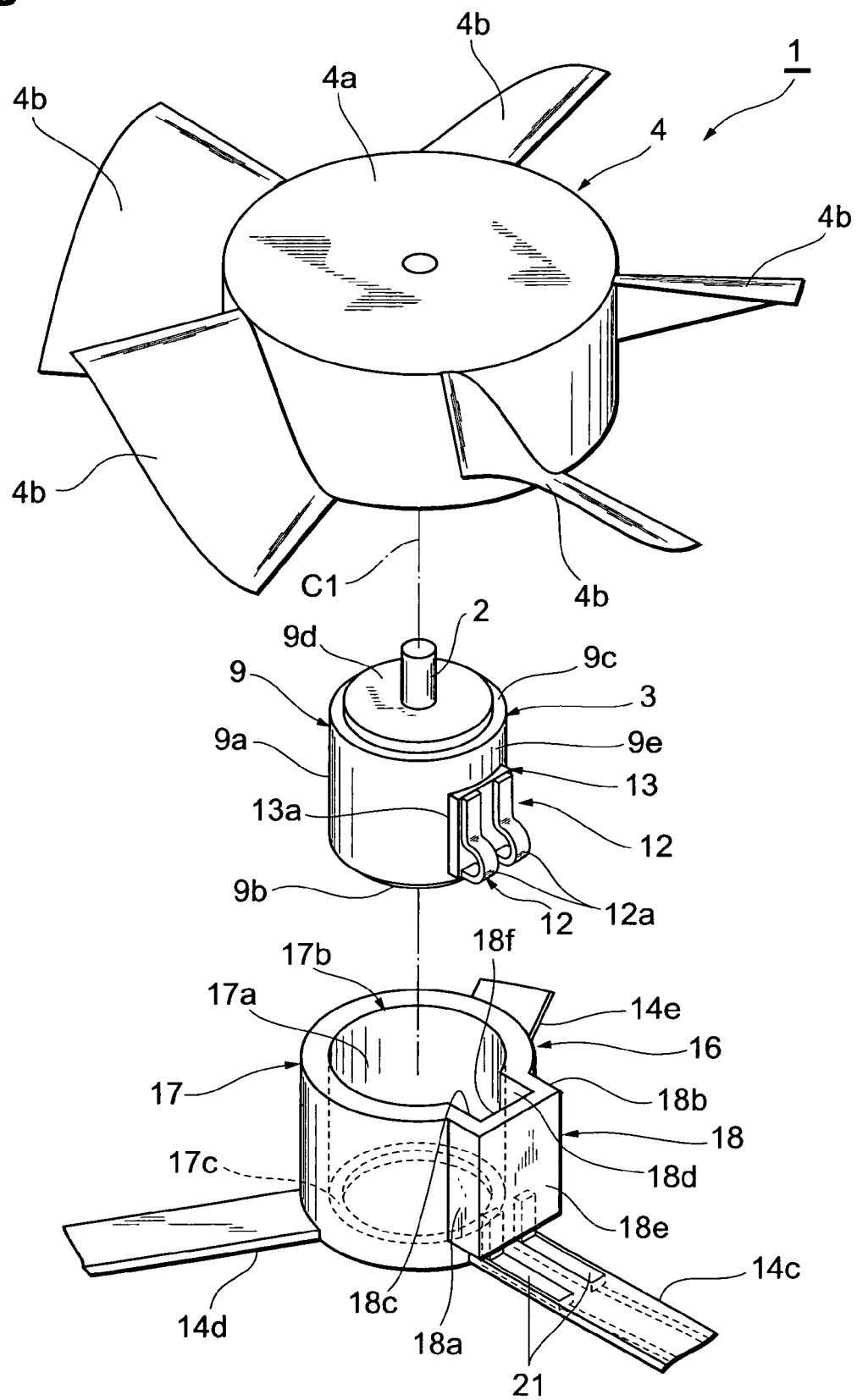
FIG. 3 is an exploded perspective view of the compact fan motor according to the present invention.

As shown in FIGS. 1 to 3, the compact fan motor 1 includes a motor body 3 having a rotating shaft 2, an impeller 4 fixed to the shaft 2, and a housing 6 accommodating the motor body 3 and the impeller 4. The compact fan motor 1 is a small axial flow fan motor that sends out air in a direction along an axis of rotation C1 of the shaft 2 by rotation of the impeller 4, and is incorporated in an electronic device such as a mobile phone and a personal computer to cool the device.

The motor body 3 includes a tubular case 9 for accommodating a rotor 7 and a permanent magnet 8. The tubular case 9 includes a metallic tubular body portion 9a and a bottom bracket 9b, which is fixed to a back end of the body portion 9a by pressing. A step portion 9c is formed at a front end of the body portion 9a by diameter reduction and a neck 9d (front end) sticks out from the body portion 9a. Bearings are press-fitted into the neck 9d and the bottom bracket 9b respectively, and the shaft 2 is pivotally supported by the bearings. The shaft 2 sticks out by penetrating the neck 9d.

The permanent magnet 8 as a stator is stuck to an inner circumferential surface of the body portion 9a of the tubular case 9. The permanent magnet 8 surrounds the rotor 7 fixed to the shaft 2. A coil is wound around a core of the rotor 7 and the coil is connected to a commutator 10 fixed to the shaft 2 on the back end side of the tubular case 9. A pair of brushes 11 slidingly contacts with the commutator 10.

The pair of brushes 11 is soldered to a pair of spring terminals 12. The spring terminals 12 are made of a copper band-like member and are mounted to a rectangular terminal block 13 along the axis of rotation C1 of the shaft 2. A back surface of the terminal block 13 touches a peripheral wall 9e and the terminal block 13 is fixed to the peripheral wall 9e of the body portion 9a. A pair of parallel sidewall surfaces 13a extending in the direction along the axis of rotation C1 of the shaft 2 is formed on the terminal block 13.

One end of the spring terminal 12 provided on the terminal block 13 reaches an inner portion of the tubular case 9 and is soldered to the brush 11. The other end of the spring terminal 12 exposes itself from the terminal block 13, a U-shaped curved contact portion 12a is formed at one end of the exposed spring terminal 12, and a front portion from the contact portion 12a extends while contacting with a surface of the terminal block 13. The contact portion 12a of the spring terminal 12 elastically deforms as if to be crushed when pressed, and has elasticity in a direction perpendicular to the axis of rotation C1 of the shaft 2.

The housing 6 includes an outer frame portion 14a, which is made of resin and has a cylindrical shape in outline, and a holder 16, which is formed integrally with the outer frame portion 14a serving as a wind tunnel and into which the motor body 3 is loaded. The holder 16, which is arranged approximately in a central portion of the outer frame portion 14a, is connected to the outer frame portion 14a by three beams 14c, 14d, and 14e. Also, a flange 14b is formed integrally with the outer frame portion 14a and a through hole for mounting is formed at four corners of the flange 14b.

A case accommodating portion 17 having an inner wall surface 17a that has a closed-end cylindrical shape and corresponds to a shape of the peripheral wall 9e of the tubular case 9 is provided in the holder 16, and the three beams 14c, 14d, and 14e are fixed to the back end of the case accommodating portion 17. Further, the open front end of the case accommodating portion 17 is a motor body insertion opening 17b. A terminal block accommodating portion 18, whose cross section is C-shaped, sticks out from the sidewall of the case accommodating portion 17, and the terminal block accommodating portion 18 communicates with the case accommodating portion 17. A pair of parallel guide surfaces 18c and 18d extending in the direction of the axis of rotation C1 of the shaft 2 are formed on left and right walls 18a and 18b of the terminal block accommodating portion 18 and further, a front wall 18e of the terminal block accommodating portion 18 couples the left and right walls 18a and 18b together and has an inner wall surface 18f extending in the direction along the axis of rotation C1 of the shaft 2.

The housing 6 has two copper L-shaped conductors 21 formed by insert molding in parallel. One end of the conductors 21 is buried in the front wall 18e of the terminal block accommodating portion 18 and a surface 21a (See FIG. 2) of the conductors 21 is exposed so as to be flush with the inner wall surface 18f of the front wall 18e. The conductors 21 and the spring terminals 12 are made to be electrically connectable by contact of the contact portion 12a of the spring terminals 12 with the surface 21a. The other end 21b side of the conductors 21 is buried in the beam 14c. The beam 14c has groove 14f through which two lead wires 22 are inserted, and a connection portion 22a of the lead wire 22 is soldered to the other end 21b of the conductors 21.

The tubular case 9 of the motor body 3 is inserted through the motor body insertion opening 17b of the case accommodating portion 17 and at this point, the bottom bracket 9b of the tubular case 9, which is the bottom of the motor body 3, comes into contact with a bottom 17c of the case accommodating portion 17. When inserting the tubular case 9 into the case accommodating portion 17, the pair of sidewall surfaces 13a formed on the terminal block 13 is moved slidingly along the pair of guide surfaces 18c and 18d of the terminal block accommodating portion 18. The terminal block 13 is thereby guided along the guide surfaces 18c and 18d, and the contact portions 12a of the spring terminals 12 move in the direction of the axis of rotation C1 while contacting with the conductors 21. At this point, the tubular case 9 is pressed in the direction perpendicular to the axis of rotation C1 of the shaft 2 by an elastic force of the contact portions 12a of the spring terminals 12. Then, the tubular case 9 is pushed against the inner wall surface 17a of the case accommodating portion 17 by the elastic force of the spring terminals 12 and temporarily held. Further, since the terminal block 13 is sandwiched by the guide surfaces 18c and 18d of the terminal block accommodating portion 18 while temporarily held, the tubular case 9 fixed to the terminal block 13 is constrained around the axis of rotation C1 of the shaft 2.

Figure 4:
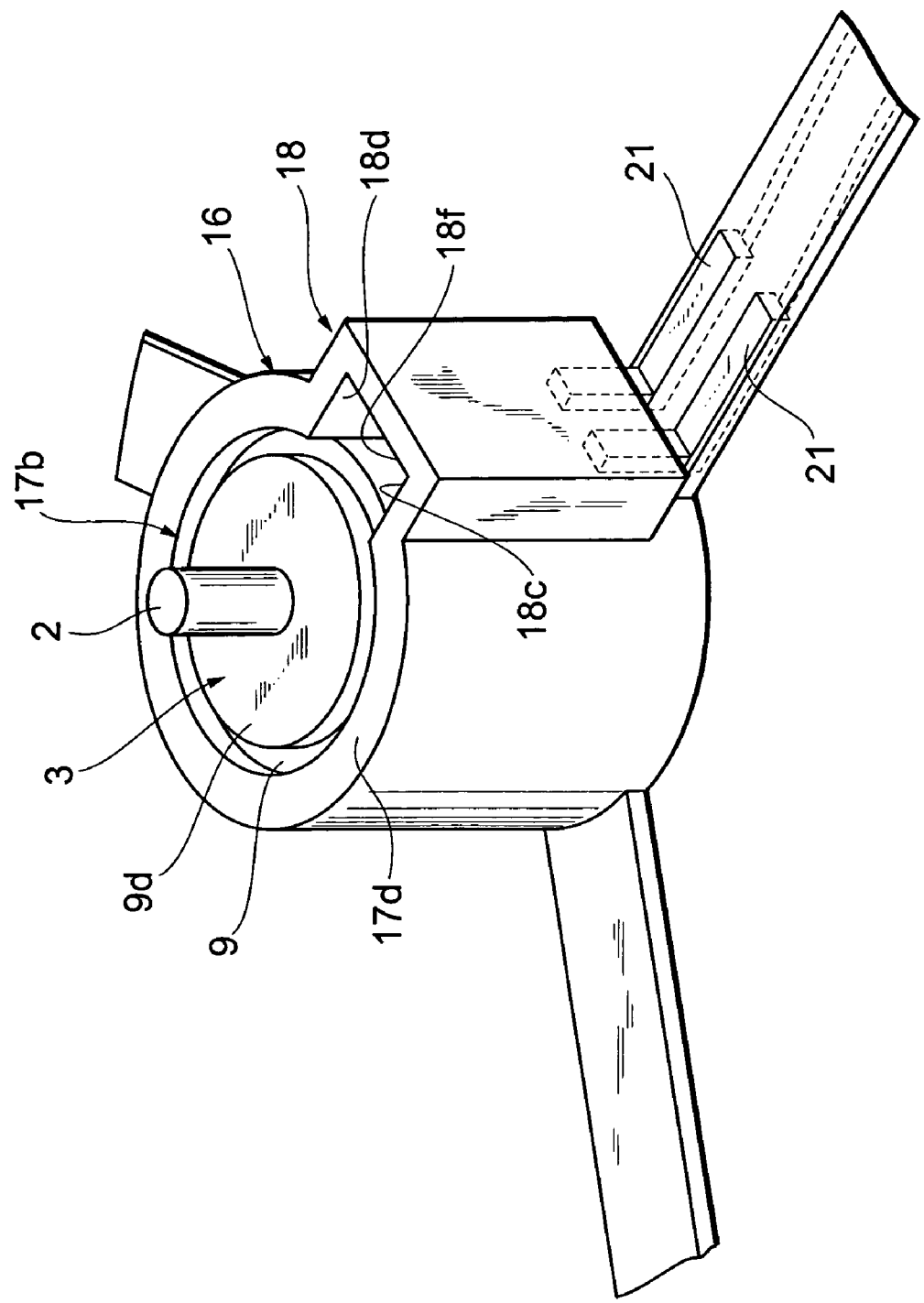
FIG. 4 is a perspective view showing a state immediately after loading a motor body into a holder and before pressing the holder.
Figure 5:
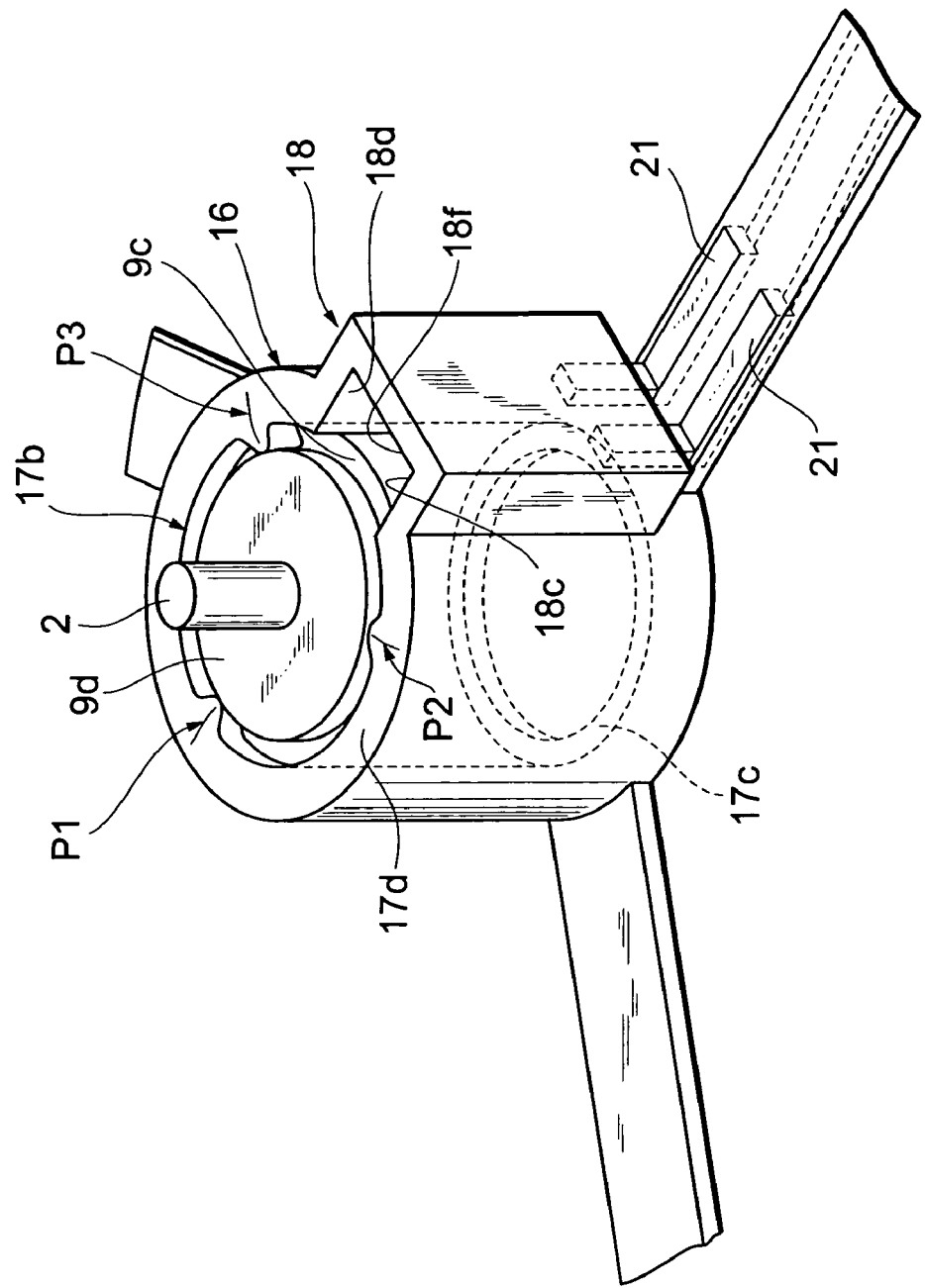
FIG. 5 is a perspective view showing a state in which the holder is pressed after loading the motor body into the holder.

When the tubular case 9 of the motor body 3 is inserted into the holder 16, as shown in FIG. 4, the motor body insertion opening 17b of the holder 16 sticks out slightly from the neck 9d of the tubular case 9. Then, as shown in FIG. 5, pressing portions P1 to P3 are provided at three locations equidistantly around the axis of rotation C1 of the shaft 2 at an edge 17d on the motor body insertion opening 17b side of the case accommodating portion 17. The pressing portions P1 to P3 are deformed by a jig from above as if to crush the pressing portions P1 to P3 to bring them into contact with the step portion 9c of the tubular case 9. At this point, the bottom bracket 9b of the motor body 3 is pushed against the bottom 17c of the case accommodating portion 17 of the holder 16. With this pressing, the tubular case 9 of the motor body 3 is firmly fixed to the holder 16.

As shown in FIG. 1 to FIG. 3, the impeller 4 has a boss portion 4a, which is made of resin and has a closed-end cylindrical shape, and five vanes 4b that are formed integrally with the boss portion 4a and provided equidistantly along an outer circumference of the boss portion 4a. A bush 4c (See FIG. 2) into which a tip portion of the shaft 2 is press-fitted is provided in the boss portion 4a. The impeller 4 is accommodated in the outer frame portion 14a of the housing 6. When an end of the shaft 2 is press-fitted into the bush 4c of the boss portion 4a, the boss portion 4a covers the holder 16.

The above-described compact fan motor 1 has the rotor 7 and the permanent magnet 8 accommodated in the tubular case 9 of the motor body 3 and there is no need for providing a magnet on the back side of the impeller, as is a case with a conventional fan motor (See Patent Documents 1 and 2), and as a result, it is easier to broaden an effective area in the diameter direction of the vane 4a of the impeller 4 even if the impeller 4 is made smaller. It is also easier to extend the effective area of the vane 4a of the impeller 4 in the direction along the axis of rotation C1 of the shaft 2 because less constraint is imposed on layout on the back side of the impeller 4. Further, when mounting the motor body 3 to the holder 16 through the motor body insertion opening 17b, the motor body 3 is inserted through the motor body insertion opening 17b while positioning the spring terminals 12 so as to maintain contact with the conductors 21. Then, the tubular case 9 is pressed in the direction perpendicular to the axis of rotation C1 of the shaft 2 by an elastic force of the spring terminals 12 so that the tubular case 9 is pushed against the inner wall surface 17a of the case accommodating portion 17, temporarily holding the motor body 3 to the holder 16. Since the motor body 3 is temporarily held to the holder 16 while the spring terminals 12 contact with the conductors 21, as described above, assembly of the compact fan motor 1 is made easier and also a stable energized state between the spring terminals 12 and the conductors 21 can be maintained more easily. Further, use of conventionally known motor body 3 makes reduction in the number of components and costs possible.

Further, the motor body 3 has the terminal block 13 on which the spring terminals 12 are mounted, the pair of parallel sidewall surfaces 13a extending in the direction of the axis of rotation C1 of the shaft 2 is provided on the terminal block 13, the terminal block accommodating portion 18 that extends in the direction of the axis of rotation C1 of the shaft 2 and has a communicates with the case accommodating portion 17 is provided in the holder 16, and the pair of parallel guide surfaces 18c and 18d extending in the direction of the axis of rotation C1 of the shaft 2 are formed in the terminal block accommodating portion 18 so as to sandwich the pair of the sidewall surfaces 13a. With the structure described above, the spring terminals 12 and conductors 21 can easily be brought into contact during assembly by inserting the pair of sidewall surfaces 13a of the terminal block 13 along the guide surfaces 18c and 18d of the terminal block accommodating portion 18. Also, when mounting the motor body 3 to the holder 16, the spring terminals 12 and conductors 21 are less likely to be dislocated and contact failure will not occur. Furthermore, since the terminal block 13 is sandwiched by the pair of guide surfaces 18c and 18d of the terminal block accommodating portion 18, the motor body 3 can be prevented from swinging inside the holder 16, making maintenance of a stable energized state between the spring terminals 12 and conductors 21 still easier.

Further, by pressing the edge 17d by force of the motor body insertion opening 17b side of the holder 16 (See FIG. 5), the bottom bracket 9b, which is the bottom of the motor body 3, is pushed against the bottom 17c of the case accommodating portion 17, which is the bottom of the holder 16 to fix the motor body 3 inside the holder 16. By pressing the holder 16 in such a position, the motor body 3 can easily and reliably be fixed to the housing 6 after loading the motor body 3 into the holder 16, preventing the motor body 3 from falling through the motor body insertion opening 17b. Also, if the metallic tubular case 9 is fixed to the resin holder 16 only by press fitting, for example, the fixed portion is likely to be affected by aging due to different coefficients of thermal expansion resulting from a difference in material. If, however, the motor body 3 is fixed to the holder 16, as described above, the fixed portion is less likely to be affected by aging even if the holder 16 and motor body 3 are made of different materials, contributing to longer life.

The present invention is not limited to the embodiment described above and may be applied to a side flow type compact fan motor equipped with an impeller that sends out air in the direction perpendicular to the axis of rotation C1 of the shaft 2.

Figure 6:
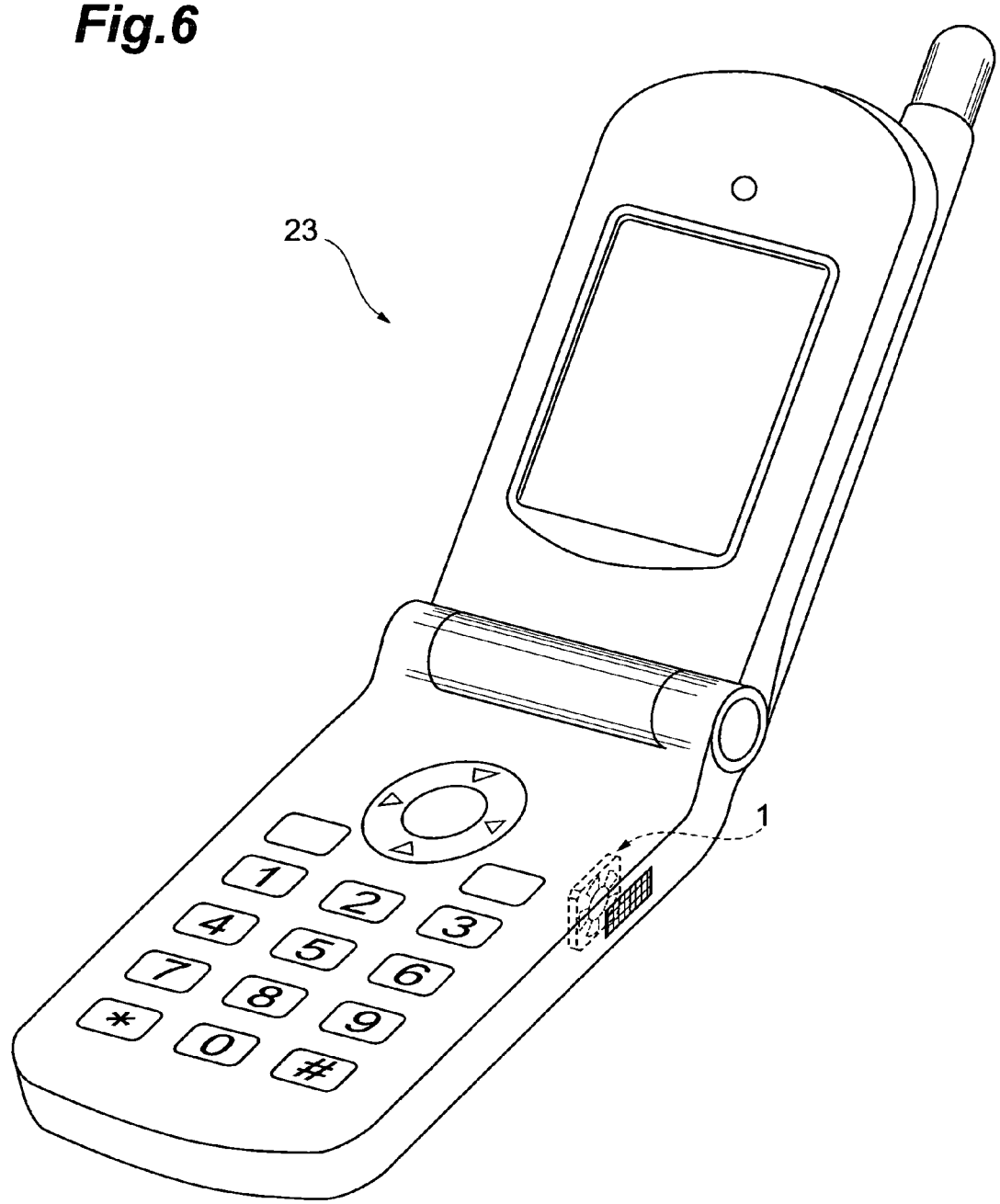
FIG. 6 is a perspective view showing a mobile phone by applying the compact fan motor thereto.

FIG. 6 is a perspective view showing a mobile phone by applying the compact fan motor thereto. A mobile phone 23 is equipped with the compact fan motor 1. The compact fan motor 1 is mounted inside the mobile phone 23 to cool heat sources (not shown) of the mobile phone 23.

By equipping various kinds of electronic devices such as communication devices such as mobile phones, on-vehicle devices such as car navigation systems, computers such as personal computers, camcorders, projectors with a compact fan motor according to the present invention, a cooling effect of these electronic devices can be enhanced and also a contribution can be made to miniaturization of these electronic devices. Further, by applying to electronic devices that diffuse an aromatic, an effect of diff-using an aroma can be enhanced and also a contribution can be made to miniaturization of electronic devices.

What is claimed is:

1. A compact fan motor comprising:
    a motor body having a rotor with a commutator fixed to a shaft, a stator surrounding the rotor, a pair of brushes slidingly contacting with the commutator, a tubular case for accommodating the rotor, the stator, and the brushes, and a pair of spring terminals connected to the brushes, sticking out from a peripheral wall of the tubular case, and having elasticity in a direction perpendicular to an axis of rotation of the shaft;
    an impeller fixed to the shaft that sticks out from a front end of the tubular case;
    a holder having a case accommodating portion that is provided in a housing accommodating the motor body and the impeller and has an inner wall surface extending in the direction of the axis of rotation of the shaft, and a motor body insertion opening provided at an edge of the case accommodating portion; and
    a pair of conductors provided on the inner wall surface of the holder and contacts with the spring terminals.

2. The compact fan motor according to claim 1, wherein the motor body has a terminal block on which the spring terminals are attached, a pair of parallel sidewall surfaces extending in the direction of the axis of rotation of the shaft is provided to the terminal block, a terminal block accommodating portion extending in the direction of the axis of rotation of the shaft and communicating with the case accommodating portion is provided in the holder, and a pair of parallel guide surfaces extending in the direction of the axis of rotation of the shaft is formed in the terminal block accommodating portion so as to sandwich the pair of the sidewall surfaces.

3. The compact fan motor according to claim 2, wherein the conductors are provided on the inner wall surface of the terminal block accommodating portion.

4. The compact fan motor according to claim 1, wherein the motor body is fixed inside the holder by pressing the edge on a side of the motor body insertion opening of the holder.

5. The compact fan motor according to claim 1, further comprising:
    a tubular outer frame portion extending in the direction of the axis of rotation of the shaft; and
    a beam connecting the outer frame portion and the case accommodating portion, wherein
    the impeller sends out air in the direction along the axis of rotation of the shaft.

6. An electronic device comprising the compact fan motor according to claim 1.

* * * * *